(12) United States Patent
Joe et al.

(10) Patent No.: US 10,100,179 B2
(45) Date of Patent: Oct. 16, 2018

(54) LATEX COMPOSITION FOR DIP FORMING AND DIP-FORMED ARTICLE PREPARED THEREFROM

(71) Applicant: LG Chem, Ltd., Seoul (KR)

(72) Inventors: Won Tae Joe, Daejeon (KR); Hyun Woo Kim, Daejeon (KR); Seung Uk Yeu, Daejeon (KR); Seung Hun Yang, Daejeon (KR); Ji Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 40 days.

(21) Appl. No.: 15/516,727

(22) PCT Filed: Dec. 23, 2015

(86) PCT No.: PCT/KR2015/014158
§ 371 (c)(1),
(2) Date: Apr. 4, 2017

(87) PCT Pub. No.: WO2016/105112
PCT Pub. Date: Jun. 30, 2016

(65) Prior Publication Data
US 2017/0298210 A1 Oct. 19, 2017

(30) Foreign Application Priority Data

Dec. 23, 2014 (KR) .................. 10-2014-0186881
Dec. 21, 2015 (KR) .................. 10-2015-0183167

(51) Int. Cl.
| C08L 9/04 | (2006.01) |
|---|---|
| C08L 71/02 | (2006.01) |
| B29C 41/00 | (2006.01) |
| B29C 41/14 | (2006.01) |
| B29K 7/00 | (2006.01) |

(52) U.S. Cl.
CPC .............. *C08L 9/04* (2013.01); *B29C 41/003* (2013.01); *B29C 41/14* (2013.01); *B29K 2007/00* (2013.01); *C08L 71/02* (2013.01); *C08L 2201/52* (2013.01); *C08L 2203/02* (2013.01); *C08L 2205/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 5,670,263 A * | 9/1997 | Gazeley .................... C08J 5/02 |
|---|---|---|
| | | 2/159 |
| 6,391,409 B1 | 5/2002 | Yeh et al. |
| 6,403,706 B1 | 6/2002 | Wang et al. |
| 2005/0171272 A1 | 8/2005 | Ota et al. |
| 2012/0149859 A1 | 6/2012 | Yang et al. |
| 2014/0302265 A1 | 10/2014 | Yang et al. |
| 2015/0218352 A1 | 8/2015 | Enomoto et al. |
| 2017/0015819 A1* | 1/2017 | Enomoto .................. C08L 9/04 |
| 2017/0283599 A1 | 10/2017 | Cha et al. |

FOREIGN PATENT DOCUMENTS

| EP | 0594410 A2 | 4/1994 |
|---|---|---|
| EP | 2548919 A1 | 1/2013 |
| JP | H11092595 A | 4/1999 |
| JP | 2003165814 A | 6/2003 |
| JP | 2003277523 A | 10/2003 |
| JP | 2014530289 A | 11/2014 |
| JP | 2017532406 A | 11/2017 |
| KR | 20100133638 A | 12/2010 |
| KR | 20120083031 A | 7/2012 |
| KR | 20130056505 A | 5/2013 |
| WO | 2011115093 A1 | 9/2011 |
| WO | 2014034889 A1 | 3/2014 |
| WO | 2014142424 A1 | 9/2014 |
| WO | WO -2017116227 A1 * | 7/2017 ................ C08L 9/04 |

OTHER PUBLICATIONS

International Search Report from PCT/KR2015/014158, dated Apr. 8, 2016.

* cited by examiner

*Primary Examiner* — Richard A Huhn
(74) *Attorney, Agent, or Firm* — Lerner, David, Littenberg, Krumholz & Mentlik, LLP

(57) ABSTRACT

Provided is a latex composition for dip forming which includes 100 parts by weight of a nitrile-based hybrid latex including a first latex and a second latex which have different glass transition temperatures, and 2 parts by weight to 8 parts by weight of an ion-conductive polymer having a weight-average molecular weight of 400 to 1,000. The latex composition for dip forming has excellent low-temperature stability and a dip-formed article prepared using the composition has excellent tensile strength and elongation. Since wearing comfort is improved due to a decrease in modulus, the dip-formed article may be suitable for industries requiring such properties.

19 Claims, No Drawings

LATEX COMPOSITION FOR DIP FORMING AND DIP-FORMED ARTICLE PREPARED THEREFROM

CROSS-REFERENCE TO RELATED APPLICATIONS

The present application is a national phase enrty under 35 U.S.C. § 371 of International Application No. PCT/KR2015/014158, filed Dec. 23, 2015, published in Korean, which claims the benefit of Korean Patent Application Nos. 10-2014-0186881, filed on Dec. 23, 2014, and 10-2015-0183167, filed on Dec. 21, 2015, in the Korean Intellectual Property Office, the disclosures of which are incorporated herein by reference.

TECHNICAL FIELD

The present invention relates to a latex composition for dip forming which includes a nitrile-based hybrid latex, and a dip-formed article prepared therefrom which has high tensile strength and elongation as well as improved wearing comfort due to a decrease in modulus.

BACKGROUND ART

Traditionally, natural rubbers have been mainly used as raw materials for products requiring flexibility such as gloves for industrial, medical and food applications and balloons. However, nitrile rubbers are rapidly replacing natural rubbers because the natural rubbers cause side effects, such as serious protein allergies, in some users.

Also, since nitrile rubbers have high oil resistance, the nitrile rubbers are widely used in working gloves handling organic solvents or medical and food gloves. In addition, nitrile rubber products are suitable for use by medical personnel who handle a scalpel or an injection needle because they are not easily perforated by the injection needle in comparison to natural rubber products.

Recently, many glove manufacturers are changing natural rubber glove production lines to nitrile glove production lines due to unstable supply of natural rubber, and nitrile disposable gloves have tended to be widely used while safety awareness has increased.

According to these trends, glove manufacturers aim at producing groves, which are thin but do not tear easily, in order to increase the productivity of the production of gloves, and steadily demand a latex for dip forming, which may be used to produce gloves having high tensile strength and excellent durability, from the initial production of the nitrile gloves.

Another factor, among factors that the user considers when using a glove, is wearing comfort. However, with respect to the nitrile rubber glove, since a modulus is relatively high in comparison to a glove prepared from natural rubber, wearing comfort is poor in comparison to the glove prepared from natural rubber.

There has been a continuous need to increase quality, such as tensile strength and durability, of a glove in manufacturing technique of the nitrile rubber glove, and furthermore, a glove giving wearing comfort is required. Thus, there is a need to develop a latex composition for dip forming which provides wearing comfort due to a low modulus while having high tensile strength, durability, and elongation.

DISCLOSURE OF THE INVENTION

Technical Problem

The present invention provides a latex composition for dip forming in which low-temperature stability is improved by adding an ion-conductive polymer to a nitrile-based hybrid latex, and a dip-formed article having significantly improved wearing comfort due to a low modulus while having excellent durability and tensile strength.

Technical Solution

According to an aspect of the present invention, there is provided a latex composition for dip forming which includes 100 parts by weight of a nitrile-based hybrid latex including a first latex and a second latex which have different glass transition temperatures; and 2 parts by weight to 8 parts by weight of an ion-conductive polymer having a weight-average molecular weight of 400 to 1,000.

The first latex may have a glass transition temperature of −50° C. to −25° C., and the second latex may have a glass transition temperature of −25° C. to −15° C.

The first latex may have an average particle diameter of 90 nm to 200 nm, and the second latex may have an average particle diameter of 100 nm to 200 nm.

The hybrid latex may include 30 wt % to 80 wt % of the first latex and 20 wt % to 70 wt % of the second latex.

The ion-conductive polymer may have a weight-average molecular weight of 550 to 650.

The ion-conductive polymer may include at least one selected from the group consisting of polyethylene glycol, polyethylene oxide, polypropylene glycol, and polyethylene glycol methacrylate.

The ion-conductive polymer may be polyethylene glycol, polyethylene oxide, or a mixture thereof.

The ion-conductive polymer may be diluted in an aqueous solvent to a concentration of 5% to 20%.

The ion-conductive polymer may have a glass transition temperature of −45° C. to −35° C.

The latex composition for dip forming may have a pH of 8 to 12.

The latex composition for dip forming may have a solid concentration of 10 wt % to 40 wt %.

According to another aspect of the present invention, there is provided a method of preparing a latex composition for dip forming including: preparing each of a first latex and a second latex which have different glass transition temperatures; mixing an ion-conductive polymer having a weight-average molecular weight of 400 to 1,000 with each of the first latex and the second latex to prepare a first latex composition and a second latex composition; and blending the first latex composition and the second latex composition to prepare a nitrile-based hybrid latex composition, wherein the blending is performed to obtain 100 parts by weight of the nitrile-based hybrid latex and 1 part by weight to 8 parts by weight of the ion-conductive polymer having a weight-average molecular weight of 400 to 1,000.

The nitrile-based hybrid latex may include 30 wt % to 80 wt % of the first latex having a glass transition temperature of −50° C. to −25° C. and 20 wt % to 70 wt % of the second latex having a glass transition temperature of −25° C. to −15° C.

The ion-conductive polymer may be polyethylene glycol, polyethylene oxide, or a mixture thereof.

The preparing of each of the first latex and the second latex may include preparing a monomer mixture which includes 40 wt % to 89 wt % of a conjugated diene-based monomer, 10 wt % to 50 wt % of an ethylenically unsaturated nitrile-based monomer, and 0.1 wt % to 15 wt % of an ethylenically unsaturated monomer.

Advantageous Effects

Since a latex composition for dip forming according to the present invention has improved compatibility during blending by including an ion-conductive polymer in a nitrile-based hybrid latex, low-temperature stability of the composition may be significantly improved, mechanical properties, such as tensile strength and elongation, of a dip-formed article prepared may be improved, and wearing comfort may be significantly improved due to a decrease in modulus. Furthermore, in a case in which a carboxylic acid-modified nitrile-based latex is used as two types of hybrid latexes, since the mechanical properties and modulus may be controlled, it is advantageous in the production of a target product suitable for applications. Thus, a dip-formed article prepared using the composition may be suitable for industries requiring such properties, for example, rubber glove industry.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to the present specification, in order to achieve effects such as improvements in wearing comfort, tensile strength, and elongation of a dip-formed article, provided is a latex composition for dip forming, in which a nitrile-based hybrid latex and a predetermined amount of an ion-conductive polymer having a specific weight-average molecular weight are mixed.

A latex composition for dip forming according to an embodiment of the present invention includes 100 parts by weight of a nitrile-based hybrid latex including a first latex and a second latex which have different glass transition temperatures; and 2 parts by weight to 8 parts by weight of an ion-conductive polymer having a weight-average molecular weight of 400 to 1,000.

The latex composition for dip forming may include a carboxylic acid-modified nitrile-based latex. The latex, for example, may include a latex having a glass transition temperature of −50° C. to −15° C. or −45° C. to −25° C. In a case in which the glass transition temperature of the carboxylic acid-modified nitrile-based latex satisfies the above range, a dip-formed article thus prepared may have excellent tensile strength and elongation. In a case in which the glass transition temperature is greater than −15° C., crack may easily occur in a product during the preparation of the dip-formed article, and, in a case in which the glass transition temperature is less than −50° C., tensile strength of the product may be significantly reduced during the preparation of the dip-formed article.

The carboxylic acid-modified nitrile-based latex may have an average particle diameter of 90 nm to 200 nm. In a case in which the average particle diameter of the carboxylic acid-modified nitrile-based latex is less than 90 nm, viscosity of the latex itself may increase, and limitations in quality may occur, for example, the dip-formed article prepared becomes transparent. Also, in a case in which the average particle diameter is greater than 200 nm, since an excessive amount of time is required for the preparation of the latex, productivity may be reduced and tensile strength of the formed article may also be reduced.

According to an embodiment of the present specification, the carboxylic acid-modified nitrile-based latex may be a hybrid latex including two types of latexes which have different glass transition temperatures. That is, a hybrid latex, in which two types of latexes having different glass transition temperatures are mixed in a predetermined ratio, may be used in the latex composition for dip forming. In a case in which the two types of latexes are mixed and used, physical properties, such as tensile strength elongation, and durability, of the formed article may be more easily controlled and excellent physical properties may be obtained.

In a case in which the carboxylic acid-modified nitrile-based latex is the hybrid latex, the first latex may have a glass transition temperature of −50° C. to −25° C., and the second latex may have a glass transition temperature of −25° C. to −15° C. The two types of latexes having different glass transition temperatures may be selected and prepared in the above ranges and may then be used.

In the case that the carboxylic acid-modified nitrile-based latex is the hybrid latex, the first latex may have an average particle diameter of 90 nm to 200 nm, and the second latex may have an average particle diameter of 100 nm to 200 nm. When the two types of latexes are selected, latexes having different particle diameters may be selected and used as the first latex and the second latex, or latexes having the same particle diameter may be selected, and one, in which these latexes are mixed, may be used as the hybrid latex. However, in a case in which the average particle diameter of the second latex is greater than 200 nm, a uniform film may not be formed when the second latex is mixed with the first latex to prepare a dip-formed article, and accordingly, the tensile strength may be reduced.

In the case that the carboxylic acid-modified nitrile-based latex is the hybrid latex, a mixing ratio of the two types of latexes may be 30 wt % to 80 wt % of the first latex and 20 wt % to 70 wt % of the second latex. That is, the first latex and the second latex may be mixed in a weight ratio of 3:7 to 8:2. In a case in which the first latex is included in a weight ratio of less than 3:7, since the elongation may be rapidly reduced, the durability may be reduced, and, in a case in which the first latex is included in a weight ratio of greater than 8:2, the improvement in the tensile strength may be insignificant.

The latex composition for dip forming may include the ion-conductive polymer and may include 2 parts by weight to 8 parts by weight of the ion-conductive polymer based on 100 parts by weight of the nitrile-based hybrid latex which is mixed together in the composition. Since the ion-conductive polymer may reduce a modulus of the dip-formed article by functioning as a plasticizer in the nitrile-based hybrid latex, wearing comfort may be significantly improved, and low-temperature stability of the composition itself may be significantly improved.

In a case in which the ion-conductive polymer is mixed in an amount of greater than 8 parts by weight, since syneresis time may decrease during the preparation of the latex composition for dip forming, stability of the latex composition for dip forming may be reduced and the dip-formed article may give a highly sticky feeling or the physical properties may be reduced. When the ion-conductive polymer is included in an amount of 1 part by weight to 8 parts by weight, the low-temperature stability of the latex composition for dip forming may be excellent, and since mixing characteristics with the carboxylic acid-modified nitrile-based latex are excellent, uniform mixing may be obtained.

The ion-conductive polymer may be used without particular limitation as long as it is a polymer including at least one hydroxy end group and has properties of primary alcohol, but, if possible, polyethylene glycol, polyethylene oxide, polypropylene glycol, polyethylene glycol methacrylate, or a mixture thereof may be used, and, for example, polyethylene glycol and polyethylene oxide may be used.

A weight-average molecular weight of the applicable ion-conductive polymer may be in a range of about 400 to about 1,000. In a case in which the ion-conductive polymer has a low molecular weight, the ion-conductive polymer may be significantly affected by the reactivity of the functional end group, and, in a case in which the ion-conductive polymer has a high molecular weight, since a ratio of the end group may be decreased, hydrogen bonds to etheric oxygen atoms may have a significant effect. Thus, it may be important to adjust the weight-average molecular weight within an appropriate range.

In a case in which the weight-average molecular weight is in a range of 400 to 1,000, physical properties of the latex composition for dip forming and the dip-formed article using the composition may be improved. In a case in which the weight-average molecular weight is less than 400, it may be difficult to provide a plasticizing function to the hybrid latex, and, in a case in which the weight-average molecular weight is greater than 1,000, compatibility may be deteriorated. In addition, in the case that the weight-average molecular weight is in a range of 400 to 1,000, since moisture absorption of the ion-conductive polymer according to relative humidity is appropriate, workability (syneresis) may be excellent. However, there is a need to appropriately adjust the weight-average molecular weight within the above range according to the relative humidity of the ambient environment. Also, although the present invention is not limited thereto, the weight-average molecular weight may be in a range of 550 to 650.

The ion-conductive polymer may be diluted in an aqueous solvent to a concentration of 5% to 20%. Most of the ion-conductive polymer may be a polymer having an alcohol group as a functional group. The alcohol group may decompose latex particles which are mixed together in the latex composition for dip forming and, accordingly, agglomeration of the particles may occur. Thus, it is desirable to use the ion-conductive polymer by being diluted in the aqueous solvent.

Examples of the aqueous solvent may be various types of water such as deionized water and distilled water. An organic solvent may be used without limitation as long as it is a water-soluble solvent, but it may be desirable to use an aqueous solvent such as water. Also, when the ion-conductive polymer is diluted, the concentration may be adjusted to a range of about 5% to about 20%, for example, 8% to 12%.

The ion-conductive polymer included may have a glass transition temperature of −45° C. to −35° C., but the glass transition temperature of the ion-conductive polymer is not significantly limited in selecting the ion-conductive polymer included in the latex composition for dip forming according to the present specification. That is, in a case in which the glass transition temperature of the ion-conductive polymer is within the above range, the ion-conductive polymer may reduce the glass transition temperature of the composition to −15° C. or less and may adjust the average particle diameter to 90 nm or more when the ion-conductive polymer is mixed with the carboxylic acid-modified nitrile-based latex to form the composition. The reason for this may be that since the ion-conductive polymer generally has excellent moisture absorption, mixing properties are excellent during the formation of the composition (compound) with the latex.

The latex composition for dip forming may have a pH of 8 to 12. In a case in which the pH is outside the range of 8 to 12, the stability of the latex composition for dip forming may be reduced, and the pH may be in a range of 9 to 11, for example, 9.1 to 10.8.

The latex composition for dip forming may have a solid concentration of 10 wt % to 40 wt %. In a case in which the solid concentration is less than 10 wt %, since transport efficiency of the latex composition for dip forming may be reduced, productivity may decrease. In a case in which the solid concentration is greater than 40 wt %, viscosity of the composition may be increased, and thus, limitation in storage stability may occur, for example, the composition may be solidified or an agglomeration phenomenon occurs. In order to prevent the limitation, the solid concentration is in a range of 10 wt % to 40 wt % and may be in a range of 15 wt % to 35 wt %, for example, 18 wt % to 33 wt %.

The latex composition for dip forming may further include an additive. Physical properties, such as viscosity and pH, of the latex composition for dip forming may be precisely controlled by further adding the additive, and a composition appropriate for the intended use may be configured if necessary.

For example, a vulcanizing agent, a vulcanization accelerator, an ionic cross-linking agent, a pigment, a filler, a thickener, a pH adjuster, or a mixture thereof may be used as the additive.

As the vulcanizing agent, any vulcanizing agent may be used without particular limitation as long as it is generally included in the latex composition for dip forming, and, for example, sulfur powder, precipitated sulfur, colloidal sulfur, surface-treated sulfur, insoluble sulfur, or a mixture thereof may be used. The vulcanizing agent may be included in an amount of about 0.1 part by weight to about 10 parts by weight, for example, 1 part by weight to 5 parts by weight, based on 100 parts by weight of the solid content included in the latex composition for dip forming.

As the vulcanization accelerator, any vulcanization accelerator may be used without particular limitation as long as it is typically used in the latex composition for dip forming, and, for example, 2-mercaptobenzothiazole, 2,2-dithiobis-benzothiozole-2-sulfenamide, N-cyclohexylbenzothiazole-2-sulfenamide, 2-orpholinobenzothiazole, tetramethylthiuram monosulfide, tetramethylthiuram disulfide, zinc diethyldithiocarbamate, zinc di-n-butyl-dithiocarbamate, diphenylguanidine, di-o-tolyguanidine, or a mixture thereof may be used. The vulcanization accelerator may be included in an amount of about 0.1 part by weight to about 10 parts by weight, for example, 0.5 part by weight to 5 parts by weight, based on 100 parts by weight of the solid content included in the latex composition for dip forming.

In addition, any ionic cross-linking agent, pigment, filler, or thickener may be selectively added if necessary as long as it is generally used in the art during the preparation of the latex composition for dip forming, and a potassium hydroxide aqueous solution or an aqueous ammonia solution may be used as the pH adjuster. A concentration of the pH adjuster in this case may be in a range of about 1% to about 5%, and the stability of the composition itself may be promoted by adjusting the pH of the composition using the pH adjuster.

According to another embodiment of the present specification, provided is a method of preparing a latex composition for dip forming which includes: preparing each of a first latex and a second latex which have different glass transition temperatures; mixing an ion-conductive polymer having a weight-average molecular weight of 400 to 1,000 with each of the first latex and the second latex to prepare a first latex composition and a second latex composition; and blending the first latex composition and the second latex composition to prepare a nitrile-based hybrid latex composition, wherein the blending is performed to obtain 100 parts by weight of the nitrile-based hybrid latex and 1 part by weight to 8 parts by weight of the ion-conductive polymer having a weight-average molecular weight of 400 to 1,000.

Since descriptions of the nitrile-based hybrid latex and the ion-conductive polymer overlap with those described above, the descriptions thereof will be omitted.

The preparing of each of the nitrile-based latexes may include mixing monomers of the first latex and the second latex and performing a polymerization reaction after adding additives to a mixture of the monomers.

The preparing of each of the first latex and the second latex may include preparing a monomer mixture which includes 40 wt % to 89 wt % of a conjugated diene-based monomer, 10 wt % to 50 wt % of an ethylenically unsaturated nitrile-based monomer, and 0.1 wt % to 15 wt % of an ethylenically unsaturated monomer. A glass transition temperature or an average particle diameter of the latex prepared may be controlled by adjusting an amount of each component of the monomer mixture.

A compound, which may be used as the conjugated diene-based monomer, for example, may be 1,3-butadiene, 2,3-dimethyl-1,3-butadiene, 2-ethyl-1,3-butadiene, 1,3-pentadiene, isoprene, or a mixture thereof. For example, 1,3-butadiene or isoprene may be used and 1,3-butadiene may be mainly used, but the present invention is not limited thereto.

The conjugated diene-based monomer may be included in an amount of 40 wt % to 89 wt % based on a total weight of the monomer mixture. In a case in which the amount of the conjugated diene-based monomer is less than 40 wt %, since hardness of the dip-formed article prepared may increase, wearing comfort may be significantly reduced. In a case in which the amount of the conjugated diene-based monomer is greater than 89 wt %, oil resistance and tensile strength of the dip-formed article prepared may be reduced. Thus, it may be desirable to use the conjugated diene-based monomer in an amount of 40 wt % to 89 wt % to improve physical properties, such as oil resistance and tensile strength, of the dip-formed article and the wearing comfort of the dip-formed article.

The conjugated diene-based monomer may be included in an amount of 45 wt % to 80 wt %, for example, 50 wt % to 75 wt %. Since the glass transition temperature of each latex included in the nitrile-based hybrid latex may be controlled by adjusting the amount of the conjugated diene-based monomer, it may be important to adjust the conjugated diene-based monomer to an appropriate amount.

A compound, which may be used as the ethylenically unsaturated nitrile-based monomer, for example, may be acrylonitrile, methacrylonitrile, fumaronitrile, α-chloronitrile, α-cyano ethyl acrylonitrile, or a mixture thereof. For example, acrylonitrile or methacrylonitrile may be used, but the present invention is not limited thereto.

The ethylenically unsaturated nitrile-based monomer may be included in an amount of 10 wt % to 50 wt % based on the total weight of the monomer mixture. In a case in which the amount is less than 10 wt %, the oil resistance and tensile strength of the dip-formed article prepared may be reduced. In a case in which the amount is greater than 50 wt %, since the hardness of the dip-formed article prepared may increase, the wearing comfort may be significantly reduced. Thus, it may be desirable to use the ethylenically unsaturated nitrile-based monomer in an amount of 10 wt % to 50 wt % to improve the physical properties, such as oil resistance and tensile strength, of the dip-formed article and the wearing comfort of the dip-formed article, and the ethylenically unsaturated nitrile-based monomer, for example, may be included in an amount of 15 wt % to 45 wt %, or 20 wt % to 40 wt %.

As the ethylenically unsaturated monomer, for example, an ethylenically unsaturated carboxylic acid monomer such as acrylic acid, methacrylic acid, itaconic acid, maleic acid, or fumaric acid; a polycarboxylic acid anhydride such as a maleic anhydride or citraconic anhydride; an ethylenically unsaturated sulfonic acid monomer such as styrene sulfonate; an ethylenically unsaturated polycarboxylic acid partial ester monomer such as fumaric acid monobutyl, maleic acid monobutyl, or maleic acid mono-2-hydroxypropyl; or a mixture thereof may be used. Among them, methacrylic acid, for example, may be used, but the present invention is not limited thereto.

The ethylenically unsaturated monomer may be included in an amount of 0.1 wt % to 15 wt % based on the total weight of the monomer mixture. In a case in which the amount is less than 0.1 wt %, the oil resistance and tensile strength of the dip-formed article prepared may be reduced. In a case in which the amount is greater than 15 wt %, since the hardness of the dip-formed article prepared may increase, the wearing comfort may be significantly reduced. Thus, it may be desirable to use the ethylenically unsaturated monomer in an amount of 0.1 wt % to 15 wt % to improve the physical properties, such as oil resistance and tensile strength, of the dip-formed article and the wearing comfort of the dip-formed article, and the ethylenically unsaturated monomer, for example, may be included in an amount of 0.5 wt % to 9.0 wt %, or 1.0 wt % to 8.0 wt %.

The first latex and the second latex may selectively further include an ethylenically unsaturated monomer which is copolymerizable with the ethylenically unsaturated nitrile-based monomer and the ethylenically unsaturated monomer, but is a different type.

Specifically, the above-described ethylenically unsaturated monomer, for example, may include at least one selected from the group consisting of a vinyl aromatic monomer selected from the group consisting of styrene, alkyl styrene, and vinyl naphthalene; a fluoroalkyl vinyl ether such as a fluoroethyl vinyl ether; an ethylenically unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, and 1,4-hexadiene; and an ethylenically unsaturated carboxylic acid ester monomer selected from the group consisting of (meth)acrylic acid methyl, (meth)acrylic acid ethyl, (meth)acrylic acid butyl, (meth)acrylic acid-2-ethylhexyl, (meth)acrylic acid trifluoroethyl, (meth)acrylic acid tetrafluoropropyl, maleic acid dibutyl, fumaric acid dibutyl, maleic acid diethyl, (meth)acrylic acid methoxymethyl, (meth)acrylic acid ethoxyethyl, (meth)acrylic acid methoxyethoxyethyl, (meth)acrylic acid cyanomethyl, (meth)acrylic acid 2-cyanoethyl, (meth)acrylic acid 1-cyanopropyl, (meth)acrylic acid 2-ethyl-6-cyanohexyl, (meth)acrylic acid 3-cyanopropyl, (meth)acrylic acid hydroxyethyl, (meth)acrylic acid hydroxypropyl, glycidyl(meth)acrylate, and dimethylamino ethyl(meth)acrylate.

The ethylenically unsaturated monomer, which may be selectively used during the copolymerization, may be used in an amount of 20 wt % or less based on the total weight of the monomer mixture, and, in a case in which the amount is greater than 20 wt %, since a balance between tensile strength and smooth wearing comfort is poor, the quality of the dip-formed article may be poor.

A method of adding the monomers constituting each of the first latex and the second latex is not particularly limited, and any method may be used among a method of adding the monomer mixture to a polymerization reactor at once, a method of continuously adding the monomer mixture to a polymerization reactor, or a method of adding a portion of the monomer mixture to a polymerization reactor and then continuously adding the remaining monomer to the polymerization reactor.

The preparing of each of the first latex and the second latex may further include adding an emulsifier to the monomer mixture.

An anionic surfactant, a nonionic surfactant, a cationic surfactant, and an amphoteric surfactant, for example, may be used as the emulsifier. Among these surfactants, the anionic surfactant, such as alkylbenzene sulfonate, aliphatic sulfonate, a sulfate ester salt of higher alcohol, α-olefin sulfonate, an alkyl ether sulfate ester salt, or a mixture thereof, may be used, but the present invention is not limited thereto.

Although an amount of the emulsifier added is not particularly limited, the emulsifier may be added in an amount of about 0.3 part by weight to about 10 parts by weight, for example, 0.8 part by weight to 8 parts by weight, or 1.5 parts by weight to 6 parts by weight, based on 100 parts by weight of the monomer mixture. In a case in which the emulsifier is added in an amount of less than 0.3 part by weight, stability of the polymerization reaction may be reduced, and, in a case in which the emulsifier is added in an amount of greater than 10 parts by weight, since a large amount of bubbles may be generated in the composition, it may become a limitation during the preparation of the dip-formed article.

The type and amount of the emulsifier are important factors controlling the average particle diameter of each latex included in the nitrile-based hybrid latex, wherein it may be important to select the type of the emulsifier and determine the amount of the emulsifier in order to prepare a latex having desired physical properties.

The preparing of each of the first latex and the second latex may further include adding a polymerization initiator to the monomer mixture.

A radical initiator, for example, may be used as the polymerization initiator, and inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxy isobutyrate; azobisisobutyronitrile, azobis-2,4-dimethylvaleronitrile, azobiscyclohexanecarbonitrile, azobis methyl isobutyric acid, or a mixture thereof may be used as the radical initiator. Among the above-described radical initiators, the inorganic peroxides may be used and, among the inorganic peroxides, persulfates may be particularly used, but the present invention is not limited thereto.

Although an amount of the polymerization initiator added is not particularly limited, the polymerization initiator may be added in an amount of about 0.01 part by weight to about 2 parts by weight, for example, 0.02 part by weight to 1.5 parts by weight, based on 100 parts by weight of the monomer mixture. In a case in which the polymerization initiator is added in an amount of less than 0.01 part by weight, since a polymerization rate is excessively low, the reaction may be difficult to be completed. In a case in which the polymerization initiator is added in an amount of greater than 2 parts by weight, since the polymerization rate is excessively high, it may be difficult to control the polymerization reaction.

The preparing of each of the first latex and the second latex may further include adding a chain transfer agent to the monomer mixture.

The chain transfer agent may include mercaptans such as α-methyl styrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethyl thiuram disulfide, dipentamethylene thiuram disulfide, and diisopropyl xanthogen disulfide. The chain transfer agent may be used alone or in a combination of two or more thereof. Among these chain transfer agents, the mercaptans may be used and, for example, t-dodecyl mercaptan may be used, but the present invention is not limited thereto.

Although an amount of the chain transfer agent added is not particularly limited, the chain transfer agent may be added in an amount of about 0.1 part by weight to about 2.0 parts by weight, for example, 0.2 part by weight to 1.5 parts by weight, or 0.3 part by weight to 1.0 part by weight, based on 100 parts by weight of the monomer mixture. In a case in which the chain transfer agent is added in an amount of less than 0.1 part by weight, the physical properties of the dip-formed article may be significantly reduced, and, in a case in which the chain transfer agent is added in an amount of greater than 2.0 parts by weight, the stability of the polymerization reaction may be reduced.

The preparing of each of the first latex and the second latex may further include adding an auxiliary additive to the monomer mixture. An activator, a chelating agent, a dispersant, a deoxidizer, a particle size modifier, an antioxidant, an oxygen scavenger, or a mixture thereof, for example, may be further added as the auxiliary additive.

For example, sodium formaldehyde sulfoxylate, sodium ethylene diamine tetraacetate, ferrous sulfate, dextrose, sodium pyrophosphate, sodium sulfite, or a mixture thereof may be used as the activator, but the present invention is not limited thereto.

The preparing of each of the first latex and the second latex may further include performing a polymerization reaction by adding the emulsifier, the chain transfer agent, the polymerization initiator, and other auxiliary additives as well as the monomer mixture. However, since the polymerization reaction may be started after the monomer mixture is added and the additives may then be added in a specific sequence during the reaction or a specific additive may be added before the reaction, a sequence of adding materials, such as the emulsifier, the chain transfer agent, and the polymerization initiator, the auxiliary additives, and the monomer mixture is not particularly limited.

The polymerization reaction may be performed in a temperature range of 10° C. to 90° C., for example, 20° C. to 80° C., or 25° C. to 75° C., and a conversion rate when the polymerization reaction is stopped may be 90% or more, for example, 93% or more.

Thus, after the completion of the polymerization reaction, a carboxylic acid-modified nitrile-based latex may be obtained by removing an unreacted monomer and adjusting the solid concentration and pH. The solid concentration may be adjusted by using water such as distilled water or deionized water, and, as described above, there is a need to adjust the solid concentration to be in a range of 10 wt % to 40 wt %. Also, as described above, there is a need to adjust the pH to be in a range of 8 to 12, and the pH may be adjusted by using a 1% to 5% potassium hydroxide aqueous solution or ammonia water.

When the first latex and the second latex are prepared as described above, the first latex and the second latex may be respectively mixed and blended with the ion-conductive polymer to prepare a hybrid latex composition.

That is, the first latex having a glass transition temperature of −50° C. to −25° C. and an average particle diameter of 90 nm to 200 nm is prepared, the second latex having a glass transition temperature of −25° C. to −15° C. and an average particle diameter of 100 nm to 200 nm is prepared, and 30 wt % to 80 wt % of the first latex and 20 wt % to 70 wt % of the second latex may be mixed to prepare a hybrid latex.

In this case, as described above, the type and amount of the emulsifier and the amount of the conjugated diene-based monomer may be appropriately adjust to match the glass transition temperature and average particle diameter to those of the first latex and the second latex.

Since description of the mixing ratio of the hybrid latex overlaps with that described above, the description thereof will be omitted.

However, the preparing of the hybrid latex composition may be performed by first mixing each of the first latex and the second latex prepared by the above-described method with the ion-conductive polymer and blending the first latex composition and the second latex composition. The amount of the ion-conductive polymer finally included in the hybrid latex composition may be in a range of 2 parts by weigh to 8 parts by weight based on 100 parts by weight of the hybrid latex.

Since full descriptions of the type and amount of the ion-conductive polymer overlap with those described above, the descriptions thereof will be omitted.

The preparing of the composition may further include adding an additive to the composition. A vulcanizing agent, a vulcanization accelerator, an ionic cross-linking agent, a pigment, a filler, a thickener, or a mixture thereof may be used as the additive, and, since detailed descriptions of the additives overlap with those described above, the descriptions thereof will be omitted.

A method of preparing a dip-formed article according to another embodiment of the present specification includes adding the above-described latex composition for dip forming to a dip-forming mold and heating the mold.

Specifically, the method of preparing a dip-formed article may include the steps of: (a) dipping a dip-forming mold in a coagulant solution to adhere a coagulant to a surface of the dip-forming mold; (b) dipping the coagulant adhered dip-forming mold in the above-described latex composition for dip forming to form a dip-forming layer; and (c) heating the dip-forming layer formed on the dip-forming mold to cross-link a latex resin.

The step (a) may be a step of dipping a dip-forming mold in a coagulant solution to adhere a coagulant to a surface of the dip-forming mold.

Examples of the coagulant may be metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these coagulant, calcium chloride and calcium nitrate may be used, but the present invention is not limited thereto.

The coagulant solution may be a solution in which the coagulant is dissolved in water, alcohol, or a mixture thereof. In general, a concentration of the coagulant in the coagulant solution may be in a range of 5 wt % to 75 wt %, for example, 15 wt % to 55 wt %, or 18 wt % to 40 wt %.

The step (b) may be a step of dipping the dip-forming mold having the coagulant adhered to the surface thereof in the above-described latex composition for dip forming to form a dip-forming layer. That is, the step (b) may be a step of forming a dip-forming layer on the dip-forming mold by dipping the coagulant adhered dip-forming mold in the latex composition for dip forming and then taking out the dip-forming mold.

The step (c) may be a step of heating the dip-forming layer formed on the dip-forming mold to cross-link a latex resin.

During the heating, a water component first evaporates, curing by cross-linking may be carried out, and a dip-formed article may be obtained as a final product by peeling off the dip-forming layer, which is cross-linked by the heating, from the dip-forming mold.

A dip-formed article according to another embodiment of the present specification is prepared by the above-described method, may be used in gloves, which may be used in various areas such as surgical gloves, examination gloves, condoms, catheters, industrial gloves, household gloves, and health care products, and may be used without particular limitation as long as it is a resin product requiring soft wearing comfort of a thin material.

EXAMPLES

Hereinafter, exemplary embodiments will be described in detail to fully explain the present invention in such a manner that it may easily be carried out by a person with ordinary skill in the art to which the present invention pertains. However, the present invention may be modified in various forms and is not limited to the disclosed embodiments.

Example 1

(1) Preparation of Hybrid Latex
<Preparation of First Latex>

A 10 L high-pressure reactor, which was equipped with a stirrer, a thermometer, a cooler, and an inlet and an outlet of nitrogen gas, and configured to allow for the continuous addition of monomers, an emulsifier, and a polymerization initiator, was purged with nitrogen, and a monomer mixture was then prepared by mixing 27 wt % of acrylonitrile, 67.5 wt % of 1,4-butadiene, and 5.5 wt % of methacrylic acid. 3.0 parts by weight of alkyl benzene sodium sulfonate as an emulsifier, 0.6 part by weight of t-dodecyl mercaptan as a chain transfer agent, and 140 parts by weight of ion exchange water were added to 100 parts by weight of the monomer mixture and the temperature was increased to 40° C.

After the temperature was increased, 0.25 part by weight of potassium persulfate, as a polymerization initiator, was added, and, when a polymerization conversion rate reached 95%, 0.1 part by weight of sodium dimethyl dithiocarbamate was added to stop the polymerization. Unreacted monomers were removed by deodorization, and ammonia water, an antioxidant, and an antifoaming agent were added to obtain a carboxylic acid-modified nitrile-based first latex having a solid content of 45% and a pH of 8.5.

A glass transition temperature of the first latex was measured by a conventional method using differential scanning calorimetry, and an average particle diameter was measured by a conventional method using a laser scattering analyzer (Nicomp). According to the analysis results, the glass transition temperature was −33° C. and the average particle diameter was 120 nm.

<Preparation of Second Latex>

A monomer mixture was prepared by mixing 29 wt % of acrylonitrile, 64.5 wt % of 1,4-butadiene, and 5.5 wt % of methacrylic acid. A second latex having a glass transition temperature of −25° C. and an average particle diameter of 120 nm was prepared in the same manner as the first latex except that 1.5 parts by weight of alkyl benzene sodium sulfonate as an emulsifier, 0.65 part by weight of t-dodecyl mercaptan as a chain transfer agent, and 140 parts by weight of ion exchange water were added to 100 parts by weight of the monomer mixture.

(2) Preparation of Latex Composition for Dip Forming

Each latex composition was prepared by mixing each of the first latex and the second latex prepared in (1) with 1 part by weight of an ion-conductive polymer, polyethylene glycol (PEG) having a weight-average molecular weight of 600 and diluted to 10%, based on 100 parts by weight of a hybrid latex in which the two latexes were mixed, a nitrile-based hybrid latex was prepared by blending the two compositions (total 2 parts by weight of the PEG were added), and a 3% potassium hydroxide solution and an adequate amount of secondary distilled water were added thereto to obtain a latex composition for dip forming which had a solid content of 25% and a pH of 10.0.

(3) Preparation of Dip-formed Article 22 parts by weight of calcium nitrate, 69.5 parts by weight of distilled water, 8 parts by weight of calcium carbonate, and 0.5 part by weight of a wetting agent (Teric 320 produced by Huntsman Corporation, Australia) were mixed to prepare a coagulant solution, and a ceramic mold was immersed in the solution for 1 minute and dried at 80° C. for 3 minutes to coat the ceramic mold with a coagulant.

Next, the coagulant-coated ceramic mold was immersed in the latex composition for dip forming prepared in (2), then dried at 80° C. for 1 minute, and immersed in hot water for 3 minutes. The mold was again dried at 80° C. for 3 minutes and cross-linked at 120° C. for 20 minutes. The cross-linked dip-forming layer was peeled off from the ceramic mold to obtain a dip-formed article.

Example 2

A latex composition for dip forming was prepared in the same manner as in Example 1 except that a first latex and a second latex were prepared in the same manner as in Example 1 and were respectively mixed with 2 parts by weight of polyethylene glycol (PEG) to prepare each composition (total 4 parts by weight of the PEG were added).

Subsequently, a dip-formed article was prepared in the same manner as in Example 1.

Example 3

A latex composition for dip forming was prepared in the same manner as in Example 1 except that a first latex and a second latex were prepared in the same manner as in Example 1 and were respectively mixed with 3 parts by weight of polyethylene glycol (PEG) to prepare each composition (total 6 parts by weight of the PEG were added).

Subsequently, a dip-formed article was prepared in the same manner as in Example 1.

Example 4

A latex composition for dip forming was prepared in the same manner as in Example 1 except that a first latex and a second latex were prepared in the same manner as in Example 1 and were respectively mixed with 4 parts by weight of polyethylene glycol (PEG) to prepare each composition (total 8 parts by weight of the PEG were added).

Subsequently, a dip-formed article was prepared in the same manner as in Example 1.

Comparative Example 1

A dip-formed article was prepared in the same manner as in Example 1 except that the first latex and second latex prepared in Example 1 were blended without the addition of PEG.

Comparative Example 2

A dip-formed article was prepared in the same manner as in Example 1 except that the first latex prepared in Example 1 was used alone without the addition of PEG.

Comparative Example 3

A dip-formed article was prepared in the same manner as in Example 1 except that the second latex prepared in Example 1 was used alone without the addition of PEG.

Evaluation Items (1) Low-temperature Stability 100 g of each of the latex compositions for dip forming prepared in Examples 1 to 4 and Comparative Example 1 was put in a polyethylene bottle and sealed, and the bottle was then stored at 4° C. for 24 hours in a low-temperature reagent refrigerator. After 24 hours, the latex compositions for dip forming were filtered using a 325 SUS mesh, weights of filtered film and coagulum were measured, and the results thereof are presented in the following Table 1.

(2) Tensile Strength, Elongation, and Stress

In order to perform a comparative analysis on physical properties of each dip-formed article prepared in Examples 1 to 4 and Comparative Example 1, tensile strength (MPa), elongation (%), stress (MPa) at 300% elongation, stress (MPa) at 500% elongation, and durability of each dip-formed article were measured.

A dumbbell-shaped specimen was fabricated from the each dip-formed article in accordance with ASTM D-412, and a breaking point of the specimen was measured after pulling the specimen at a cross-head speed of 500 mm/min using a UTM (Universal Testing Machine, Model 4466, Instron) according to ASTM D638. The tensile strength was calculated by the following Equation 1. Also, the elongation (%) was calculated by the following Equation 2, tensile strength when the specimen was elongated to 3 times its initial length was measured for the stress (MPa) at 300% elongation, and tensile strength when the specimen was elongated to 5 times its initial length was measured for the stress (MPa) at 500% elongation.

In general, the higher the tensile strength and elongation were, the better the quality of the dip-formed article was. The touch of the dip-formed article improved as the stress value at a specific elongation was decreased, and thus, the quality was excellent.

$$\text{Tensile strength(kgf/mm}^2) = \frac{\text{Load value(kgf)}}{\text{Thickness(mm)} \times \text{Width(mm)}} \quad \text{[Equation 1]}$$

$$\text{Elongation percentage(\%)} = \frac{\text{Length after elongation}}{\text{Initial length}} \times 100 \quad \text{[Equation 2]}$$

The above results are presented in the following Table 1.

(3) Syneresis

Test was performed to identify the time when water dropped from the dip-formed article facing downward during the heating of the step (c) in the process according to the above-described method of preparing a dip-formed article. In a case in which the time when the water dropped was short, since the temperature of an oven may decrease and the solid content of the latex resin may be changed, workability may be affected. Thus, it may be denoted that the workability may be reduced as a syneresis value decreased.

Evaluation Results

Results of the evaluation items for the products of Examples 1 to 4 are summarized in the following Table 1.

TABLE 1

| | PEG | Tensile strength (MPa) | Elongation (%) | Stress at 300% elongation (MPa) | Stress at 500% elongation (MPa) | Syneresis (sec) | Low-temperature stability C.G (ppm) |
|---|---|---|---|---|---|---|---|
| Example 1 | 2 | 32.8 | 610 | 5.6 | 17.2 | 83 | 23 |
| Example 2 | 4 | 34.4 | 610 | 5.1 | 14.6 | 90 | 13 |
| Example 3 | 6 | 34.5 | 616 | 4.9 | 14.3 | 96 | 28 |
| Example 4 | 8 | 35.0 | 623 | 4.3 | 13.0 | 101 | 19 |
| Comparative Example 1 | — | 32.0 | 549 | 6.8 | 19.0 | 88 | 58 |
| Comparative Example 2 | — | 31.8 | 611 | 6.0 | 15.2 | 76 | — |
| Comparative Example 3 | — | 34.3 | 547 | 7.0 | 20.9 | 99 | — |

Referring to the results of Table 1, it may be confirmed that the tensile strengths of the dip-formed articles of Examples 1 to 4, which were prepare by blending after adding PEG to each of the two types of the carboxylic acid-modified nitrile-based latexes, were improved in comparison to those of the dip-formed articles of Comparative Examples 1 to 3, and it may be understood that since the elongation and stress were improved by the reduction of the modulus and the increase of the elongation, wearing comfort was excellent. Also, it may be confirmed that a significant effect of improving the workability (syneresis) and low-temperature stability was obtained. Accordingly, compatibility of the hybrid latex may be enhanced by the addition of PEG, and thus, it may be confirmed that physical properties of the blended hybrid latex may be maximized.

Although the exemplary embodiments of the present invention have been described in detail, the scope of the present invention is not limited thereto but various modifications and improvements made by those skilled in the art using the basic concept of the present invention defined in the claims also fall within the scope of the present invention.

The invention claimed is:

1. A latex composition for dip forming, the latex composition comprising:
   100 parts by weight of a nitrile-based hybrid latex including a first latex and a second latex which have different glass transition temperatures; and
   1 to 8 parts by weight of an ion-conductive polymer having a weight-average molecular weight of 400 to 1,000.

2. The latex composition for dip forming of claim 1, wherein the first latex has a glass transition temperature of −50° C. to −25° C., and the second latex has a glass transition temperature of —25° C. to −15° C.

3. The latex composition for dip forming of claim 1, wherein the first latex has an average particle diameter of 90 nm to 200 nm, and the second latex has an average particle diameter of 100 nm to 200 nm.

4. The latex composition for dip forming of claim 1, wherein the hybrid latex comprises 30 wt % to 80 wt % of the first latex and 20 wt % to 70 wt % of the second latex.

5. The latex composition for dip forming of claim 1, wherein the ion-conductive polymer has a weight-average molecular weight of 550 to 650.

6. The latex composition for dip forming of claim 1, wherein the ion-conductive polymer comprises at least one selected from the group consisting of polyethylene glycol, polyethylene oxide, polypropylene glycol, and polyethylene glycol methacrylate.

7. The latex composition for dip forming of claim 1, wherein the ion-conductive polymer is diluted in an aqueous solvent to a concentration of 5% to 20%.

8. The latex composition for dip forming of claim 1, wherein the ion-conductive polymer has a glass transition temperature of −45° C. to −35° C.

9. The latex composition for dip forming of claim 1, wherein the latex composition has a pH of 8 to 12.

10. The latex composition for dip forming of claim 1, wherein the latex composition has a solid concentration of 10 wt % to 40 wt %.

11. The latex composition for dip forming of claim 1, further comprising an additive,
   wherein the additive comprises any one selected from the group consisting of a vulcanizing agent, a vulcanization accelerator, an ionic cross-linking agent, a pigment, a filler, a thickener, a pH adjuster, and a combination thereof.

12. A dip-formed article prepared from the latex composition of claim 1.

13. The dip-formed article of claim 12, wherein the dip-formed article comprises any one selected from the group consisting of surgical gloves, examination gloves, condoms, catheters, industrial gloves, household gloves, health care products, and a combination thereof.

14. A method of preparing a latex composition for dip forming, the method comprising:
preparing each of a first latex and a second latex which have different glass transition temperatures;
mixing an ion-conductive polymer having a weight-average molecular weight of 400 to 1,000 with each of the first latex and the second latex to prepare a first latex composition and a second latex composition; and
blending the first latex composition and the second latex composition to prepare a nitrile-based hybrid latex composition, wherein the blending is performed to obtain 100 parts by weight of the nitrile-based hybrid latex and 1 part by weight to 8 parts by weight of the ion-conductive polymer having a weight-average molecular weight of 400 to 1,000.

15. The method of claim 14, wherein the preparing of each of the first latex and the second latex comprises preparing a monomer mixture which includes 40 wt % to 89 wt % of a conjugated diene-based monomer, 10 wt % to 50 wt % of an ethylenically unsaturated nitrile-based monomer, and 0.1 wt % to 15 wt % of an ethylenically unsaturated monomer.

16. The method of claim 15, wherein the preparing of each of the first latex and the second latex comprises adding one or more selected from a group consisting of an emulsifier, a chain transfer agent, a polymerization initiator, an auxiliary additive to the monomer mixture.

17. The method of claim 15, wherein the preparing of each of the first latex and the second latex comprises performing a polymerization reaction of the monomer mixture,
wherein the polymerization reaction is performed in a temperature range of 10° C. to 90° C.

18. The method of claim 17, wherein a conversion rate of the polymerization reaction is 90% or more.

19. The method of claim 14, wherein the preparing of the hybrid latex composition comprises adding an additive to the hybrid latex composition,
wherein the additive comprises any one selected from the group consisting of a vulcanizing agent, a vulcanization accelerator, an ionic cross-linking agent, a pigment, a filler, a thickener, and a combination thereof.

* * * * *